(12) United States Patent
Kinkaide

(10) Patent No.: US 6,663,159 B2
(45) Date of Patent: Dec. 16, 2003

(54) FLEXIBLE MOUNT SYSTEM

(75) Inventor: Jim Kinkaide, Elkhart, IN (US)

(73) Assignee: Wells Cargo, Inc., Elkhart, IN (US)

( * ) Notice: Subject to any disclaimer, the term of this patent is extended or adjusted under 35 U.S.C. 154(b) by 0 days.

(21) Appl. No.: 09/910,112

(22) Filed: Jul. 20, 2001

(65) Prior Publication Data

US 2003/0015888 A1 Jan. 23, 2003

(51) Int. Cl.$^7$ ................................................. B60P 7/02
(52) U.S. Cl. ................... 296/100.01; 296/181; 296/191
(58) Field of Search ......................... 296/178, 181, 296/183, 191, 196, 29, 30, 100.01

(56) References Cited

U.S. PATENT DOCUMENTS

| | | | | |
|---|---|---|---|---|
| 2,226,886 A | | 12/1940 | Willis | 108/26 |
| 2,812,973 A | * | 11/1957 | Pritchard | 296/183 |
| 2,822,588 A | | 2/1958 | West | 20/92 |
| 3,290,077 A | * | 12/1966 | La Barge | 52/222 |
| 3,363,383 A | | 1/1968 | La Barge | 52/471 |
| 3,888,599 A | | 6/1975 | Reifsnyder | 404/69 |
| 4,007,994 A | | 2/1977 | Brown | 404/69 |
| 4,063,393 A | * | 12/1977 | Toti | 52/245 |
| 4,063,840 A | | 12/1977 | Fordyce et al. | 404/69 |
| 4,114,247 A | * | 9/1978 | Toti | 29/453 |
| 4,140,419 A | | 2/1979 | Puccio | 404/69 |
| 4,774,795 A | | 10/1988 | Braun | 52/396 |
| 4,901,495 A | | 2/1990 | Gottschling | 52/396 |
| 4,965,976 A | | 10/1990 | Riddle et al. | 52/396 |
| 5,524,394 A | * | 6/1996 | Szabo et al. | 52/36.1 |
| 5,601,198 A | * | 2/1997 | Reed | 211/183 |
| 5,791,093 A | * | 8/1998 | Diamond | 52/36.5 |

* cited by examiner

Primary Examiner—Stephen T. Gordon
Assistant Examiner—Lori L Coletta
(74) Attorney, Agent, or Firm—Barnes & Thornburg

(57) ABSTRACT

The present invention is directed to a mounting system and method of mounting at least one thermally dynamic sheet to at least one structure, which includes an elongated track affixed to the thermally dynamic sheet or the structure, and an elongated flexible mounting bracket affixed to the other of the thermally dynamic sheet or the structure. The elongated flexible mounting bracket has a foot portion adapted to slidably mount in the elongated track to provide sliding movement of the elongated flexible mounting bracket along a first axis of the thermally dynamic sheet or the structure. The system of the invention can accommodate thermal expansion/contraction in the first axis by movement of the foot in the track and in the direction transverse to the first axis by flexing of the flexible mounting bracket.

30 Claims, 3 Drawing Sheets

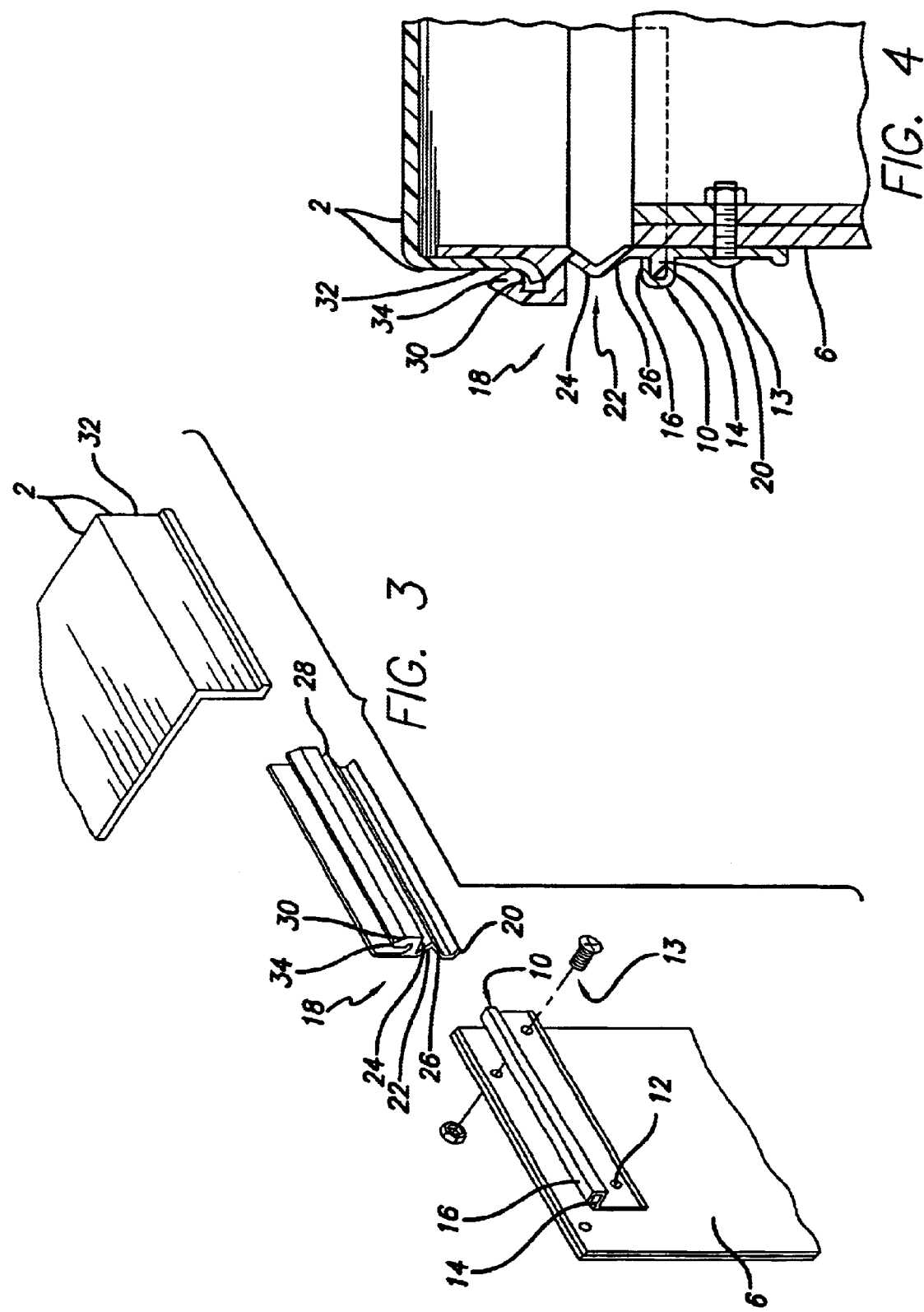

FLEXIBLE MOUNT SYSTEM

FIELD OF THE INVENTION

The present invention relates to an apparatus for providing a flexible mount assembly for securing at least one thermally dynamic article subject to significant thermal expansion.

BACKGROUND AND SUMMARY OF THE INVENTION

Typically, thermally dynamic materials such as polyvinyl chloride, polypropylene, polyethylene, and the like have an expansion coefficient of about six thousandths of an inch per inch/° F. Accordingly, when mounting relatively large pieces of thermally dynamic material, that is, ones on the order of about one and one half feet long or longer, the thermal expansion of the piece can become a problem if mounted to a material having a substantially different coefficient of thermal expansion, particularly for products that are used outdoors. For these reasons, thermally dynamic materials have not been typically used to fabricate the tops of trailers or similar articles because it has been difficult to accommodate thermal expansion and provide a proper seal from moisture between the top and the less thermally dynamic conjoined sides. Instead, materials having significantly smaller coefficients of thermal expansion have been used for the fabrication of tops of trailers or similar articles. Such materials typically included fiberglass or sheet metal. While fiberglass materials tend to serve their function, they are brittle, cumbersome to cut and form due to their fibrous nature, and more expensive than is desirable. Sheet metal is typically less brittle and easier to work with than fiberglass materials; however, it is more costly than is desirable for many applications. Thus, there exists a need for a mounting system which can accommodate the thermal expansion inherent with the use of larger pieces of relatively inexpensive thermoplastics.

One attempt to provide a mounting system for fiberglass materials is described in U.S. Pat. No. 2,822,588 issued to West. The West patent is directed to a joining strip for securing the edges of adjacent fiberglass material which include channels for receiving the longitudinal edges of the sheets. Resilient members are positioned partially in undercut grooves communicating with the channel. The resilient members have flange portions which are distorted when engaged by the fiberglass sheet to provide a "friction fit" between the sheets and the strip. Such "friction fit" joining strips disclosed in the '588 patent are disclosed as being for awnings, patio or window construction without additional fasteners. However, they are believed to provide a less robust securement than is required for "high stress" application such as trailer tops and other environments where high strength and durability are necessary.

U.S. Pat. No. 3,363,383 issued to LaBarge is directed to a flexible joint seal between two or more substantially rigid structural members. It includes an elastomeric element adapted for sealing joints between two or more rigid panels. The panels are rigidly secured against suitable conventional supporting or framing elements such as the structural angles 44 by blind rivets 46. The sealing elements of the LeBarge patent act as a seal and closure between the rigidly mounted panels rather than a flexible mounting system for securing a thermally dynamic material.

SUMMARY OF THE INVENTION

One object of an embodiment of the present invention is to provide a flexible mounting system for the mounting or conjoining of at least one of a thermally expandable and thermally inert structure, such as the conjunction of a thermally dynamic top covering of a trailer to its corresponding side walls.

Another object of an embodiment of the present invention is to provide an air and water impermeable flexible mounting system for the mounting or conjoining of at least one of a thermally dynamic structure, having a relatively large coefficient of thermal expansion, and a thermally inert structure. Additionally, such an embodiment also allows for the flexible mounting or conjoining of two thermally dynamic structures having similar, yet great, coefficients of thermal expansion.

Still another object of an embodiment of the present invention is to provide a flexible mounting system for the mounting or conjoining of a plurality of at least one of a structure, being thermally inert, and thermally dynamic sheet, having a relatively large coefficient of thermal expansion, to another thermally dynamic sheet or thermally inert structure.

These and other objects of the invention are provided by one or more of the embodiments of the invention claimed herein. A first embodiment of the invention is directed to a mounting system for securing a thermally dynamic sheet to at least one structure, which includes an elongated track affixed to the thermally dynamic sheet or the structure. An elongated flexible mounting bracket is affixed to the thermally dynamic sheet or the structure. The elongated flexible mounting bracket has a foot portion adapted to slidably mount in the elongated track to provide sliding movement of the elongated flexible mounting bracket along a first axis of the thermally dynamic sheet or the structure. The system of the invention can accommodate thermal expansion/contraction in the first axis by sliding movement of the foot in the bracket and in the direction transverse to the first axis by flexing of the flexible mounting bracket. The terms "slidably retained," "slidably mounted" and "sliding movement" as used herein mean that the flexible bracket can at least "creep" along the track to accommodate thermal expansion or contraction in at least one axis of the sheet, and do not require that the foot is capable of freely sliding within the track. Using this system, applicant has found that relatively large sheets of thermally dynamic thermoplastic materials have been mounted along at least one edge to a relatively thermally non-dynamic or inert structure, such as sheet metal, and that the mount can accommodate wide variations in temperature while maintaining the integrity of the mount, sheet, and structure. It is preferred that the flexible mounting bracket include a clamping portion for encompassing at least one edge of the thermally dynamic sheet or the structure.

Another embodiment of the present invention is directed to a mounting system (for thermally dynamic trailer covering including, a trailer with a side wall and end wall. A thermally dynamic covering is mounted to the trailer side wall and end wall by an elongated track affixed to the trailer side wall, the trailer end wall, or the thermally dynamic covering. An elongated flexible mounting bracket is affixed to the trailer side wall, the trailer end wall, or the thermally dynamic covering. The elongated flexible mounting bracket has a foot portion adapted to slidably mount in the elongated track. Utilizing the mounting system of the invention, applicants have determined that a variety of inexpensive, thermally dynamic materials may be used to provide a structurally strong, water-tight covering for trailers.

A still further embodiment of the invention is directed to a method of mounting a thermally dynamic sheet to a structure, including the steps of: (a) adhering an elongated flexible mounting bracket having a foot portion to the thermally dynamic sheet or the structure to form an adhered assembly; (b) placing the adhered assembly in contact with the thermally dynamic sheet or structure which lacks the adhered flexible mounting bracket; (c) positioning an elongated track along the thermally dynamic sheet or structure which lacks the adhered flexible mounting bracket such that the foot portion of the flexible elongated mounting bracket is retained within the track; and (d) mounting the elongated track to the thermally dynamic sheet or the structure which lacks the adhered flexible mounting bracket such that the foot portion is slidably mounted within the elongated track.

BRIEF DESCRIPTION OF THE DRAWINGS

The organization and manner of the structure and function of the invention, together with the further objects and advantages thereof, may be understood by reference to the following descriptions taken in connection with the accompanying drawings, wherein like reference numerals identify like elements, and in which:

FIG. 3 is an exploded perspective view of the mounting system of FIG. 1;

FIG. 4 is a cross-sectional view taken along lines 4—4 of FIG. 3, showing the mounting system of FIG. 1;

Figure 1:
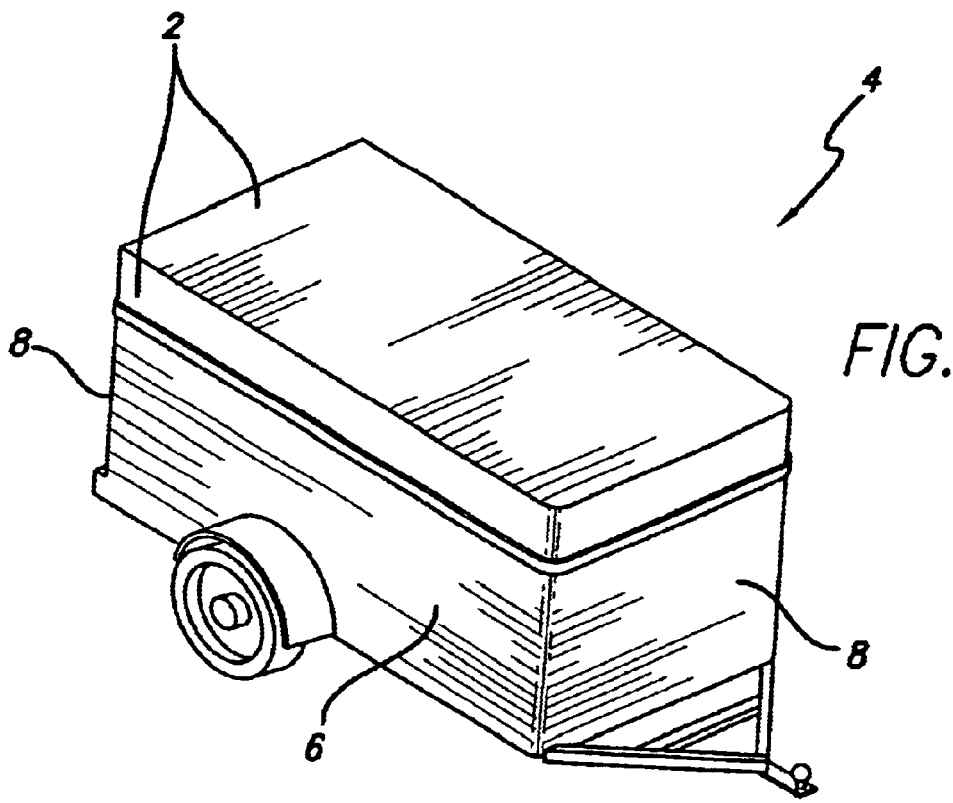
FIG. 1 is a perspective of a trailer having side walls and a top covering secured in accordance with one embodiment of the mounting system of the invention.

While the present invention is susceptible to embodiment in different forms, there is shown in the drawings, and herein will be described in detail, several embodiments with the understanding that the present description is to be considered an exemplification of the principles of the invention and is not intended to limit the invention to the embodiments illustrated and described herein.

DETAILED DESCRIPTION OF THE DRAWINGS

Figure 2:
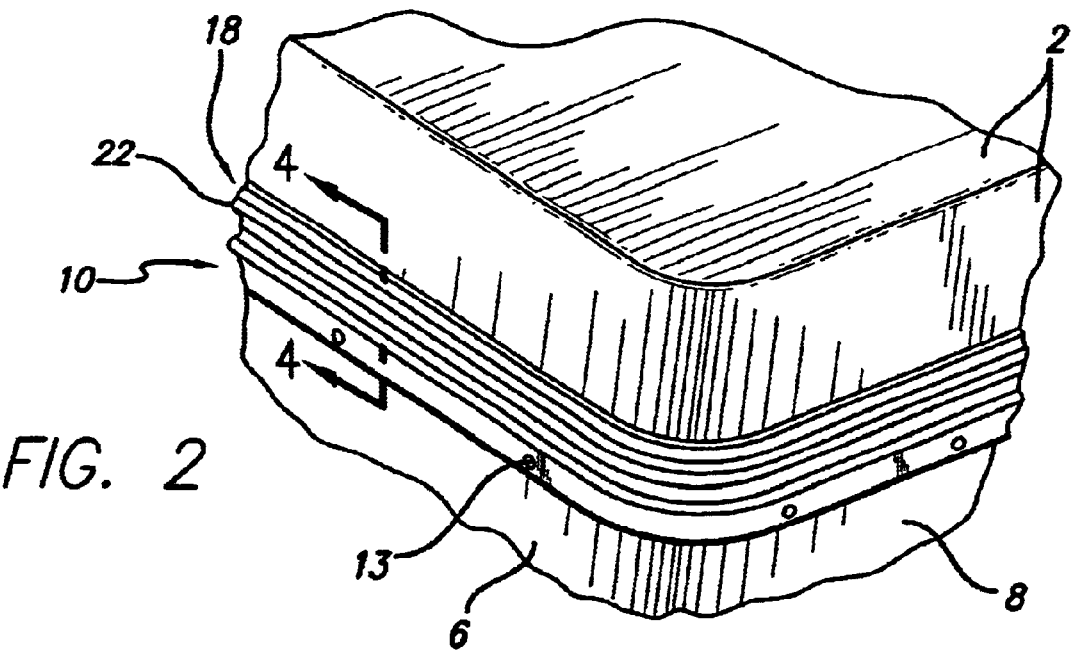
FIG. 2 is an enlarged, fragmentary, perspective view of the corner of the trailer with the mounting system of FIG. 1.

In one embodiment of the present invention, as shown in FIGS. 1–4, a Flexible Mounting System may be used to flexibly mount a relatively thermally dynamic covering 2, such as a trailer roof, to a trailer 4 with relatively thermally inert side walls 6 and end walls 8. As detailed in FIG. 2, an elongated track 10 is provided and is preferably made of a rigid material such as metal, hardened plastic or rubber and is either detachably or permanently affixed to the trailer side walls 6 and end walls 8 at fastening points 12 by any standard fasteners such as a nut and bolt 13 as shown in FIGS. 3 and 4. The elongated track 10 may be mounted to the trailer side walls 6 and end walls 8 using, but not limited to, adhesives, screws, bolts, rivets, and spot-welds. Additionally, it is contemplated that the fastening of the elongated track 10 to the trailer may wrap continually around radius corner portions 9 formed between side walls 6 and end walls 8 as shown in FIG. 2 which can yield an airtight, water-tight mount.

It is also contemplated that the elongated track 10 may also be mounted to the thermally dynamic covering 2 of the trailer 4 in which case the track must be selected from a material having a similar co-efficient of thermal expansion as the covering. In this case, the orientation of the elongated flexible mounting bracket would be exchanged with the track such that the mounting bracket would be adhered to the thermally inert trailer side walls 6 and end walls 8 and the track would be mounted to the thermally dynamic covering 2. It is further contemplated that the track may be integrally molded into the dynamic covering provided that a sufficiently strong plastic resin is chosen.

In the embodiment as shown in FIGS. 1–4, the trailer side walls 6 and end walls 8 typically have relatively small coefficients of thermal expansion compared to the thermally dynamic covering 2, and may consist of materials such as sheet metals (including steel, aluminum, tin, alloys thereof, and fiberglass), relatively thermally inert plastics, and fiberglass. The Flexible Mounting System's, elongated track 10, as previously disclosed and further detailed in FIGS. 3 and 4, includes a base portion 14 for attachment to another structure and a hooked portion 16 for receiving an elongated flexible mounting bracket 18. The elongated flexible mounting bracket 18 is slidable within the hook portion 16 of the track 10 primarily to accommodate longitudinal expansion or contraction of the thermodynamic covering 2. The elongated flexible mounting bracket 18 in turn is adhered with a suitable adhesive, preferably 3M Brand Contact Adhesive, to the thermally dynamic covering 2 or similar structural member which is subject to thermal expansion.

The thermally dynamic covering 2 is preferably made from ABS but may be made of other thermoplastic selected from the major families of polyethylene, polypropylene, polyvinyl chloride, other polystyrenes, acrylics, nylons, PET, cellulosics and/or co-polymers or blends of such materials. Additionally, other forms of adhering the dynamic covering 2 to the mounting bracket 18 such as melt-bonding, spot welding, or utilizing fasteners are also contemplated. It is further contemplated that such fastening of the elongated flexible mounting bracket 18 to the thermally dynamic covering 2 may be continuous around corners 9 of the trailer 4.

The elongated flexible mounting bracket 18 is preferably made of EPDM, but may be made from other rubber-like materials including those polymers used in the sheet rubber industry such as, natural rubber, Styrene Butadiene Rubber, Neoprene, Ethylene-Propylene, Hypalon, and Viton, which can flex through significant distances to accommodate lateral thermal expansion and contraction of the thermodynamic covering 2. As can be best seen in FIGS. 3 and 4, the elongated flexible mounting bracket 18 includes a foot portion 20 that is shaped and dimensioned to fit within, and slidably mount in the hook portion 16 of the track 10. Extending above the foot is a hinge portion 22 of the flexible mounting bracket 18 consisting of a first angled wall 24 and a second angled wall 26, which are joined at a hinge line 28. The hinge portion 22 flexes to accommodate the expansion and contraction of the thermally dynamic covering 2 or trailer side walls 6 and end walls 8. Extending from the second angled wall 26 is a C-shaped clamping portion 30, which encompasses a downward flange 32 of the thermally dynamic covering 2. An inward extension 34 of the clamping portion 30 engages the interior of the downwardly extending flange 32 of the thermally dynamic covering 2.

To construct the trailer 4 using the mounting system of the present invention, the elongated flexible mounting bracket 18 is pressed downwardly into the clamp portion 30 and adhered to the thermally dynamic covering 2 via suitable adhesive. The thermally dynamic covering 2 and flexible mounting bracket 18 are placed over the trailer frame. The trailer side wall 6 and end walls 8 are secured to the frame. The elongated track is positioned on the side wall 6 and end walls 8 such that the foot portion 20 of the flexible mounting bracket 18 is slidably retained within the hook portion 16 of the elongated track 10. The elongated track is then mounted to the side wall and end walls, preferably as a continuous strip, such that the flexible mounting bracket 18 is slidably mounted in the elongated track 10 thereby forming and air-tight and water-tight flexible mounting system.

Should an integrally formed track be used, the assembly of the trailer would necessarily change since the track could not be positioned and then fastened over the foot of the bracket. In this case, the foot of the flexible mounting bracket would be slid into the integral track in the thermally dynamic covering. The covering would be placed over the trailer frame and the upper edge of the side walls and/or end walls would be pressed into the clamp portion of the bracket and the adhesive would be applied to the bracket and edge.

Figure 5:
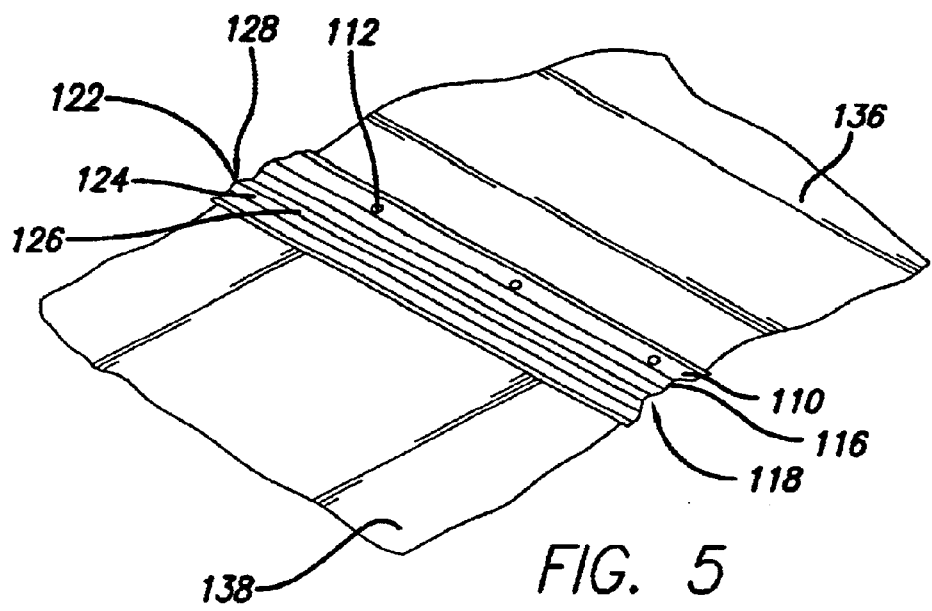
FIG. 5 is a fragmentary perspective view of another embodiment of the mounting system of the present invention.

In another preferred embodiment of the invention, as seen in FIG. 5, the Flexible Mounting System may act to provide an impermeable seal while also securing, mounting or conjoining, for example, two separate structures, at least one being a relatively thermally dynamic sheet having a relatively large coefficient of thermal expansion, and the other being a relatively thermally inert structure. Additionally, it is also contemplated that the system of the invention could be used to conjoin two similar structures, both have relatively large coefficients of thermal expansion. In this embodiment, structure 136 is preferably formed from a relatively thermally inert and rigid materials such as steel, tin, aluminum, copper, bronze, alloys thereof, relatively thermally inert plastics, or fiberglass. An elongated track 110 is attached to structure 136 in the same manner as previously described in the embodiment of FIGS. 1–4. Elongated track 110 is preferably made of a rigid material such as metal, hardened plastic or rubber and may be detachably or permanently affixed at fastening points 112 to structure 136 by any standard fastener such as adhesives, screws, bolts, rivets, melt welds or spot-welds. It is contemplated that structure 136 may also be one of a thermally dynamic nature having a relatively large coefficient of thermal expansion.

Similar to the embodiment described in FIGS. 1–4, the embodiment of FIG. 5 includes detachable or permanent adhesion of an elongated flexible mounting bracket 118 to a thermally dynamic sheet 138, having a large coefficient of thermal expansion. The sheet is preferably made of thermoplastics which includes the major families of polyethylene, polypropylene, polyvinyl chloride, polystyrene, acrylics, nylons, cellulosics, and co-polymers or blends of such materials. The elongated flexible mounting bracket 118 is preferably composed of one of the rubber-like materials described above which can flex through significant distances to accommodate lateral thermal expansion and contraction of the thermally dynamic sheet 138.

Similar to the embodiment in FIGS. 1–4, the elongated flexible mounting bracket 118 includes a foot portion (not shown) that is shaped and dimensioned to be slidably retained within, and slidably mount to, the hook portion 116. The elongated flexible mounting bracket 118 also has, extending above the foot, a hinge portion 122 consisting of a first angled wall 124 and a second angled wall 126, which forms a hinge line 128 and flexes to accommodate the expansion and contraction of the thermally dynamic sheet 138. Additionally, as previously described, extending from the second angled wall 126 is a C-shaped clamping portion similar to that shown in FIG. 4, which encompasses the thermally dynamic sheet 138. Internal extension (not shown) engages the interior of the thermally dynamic sheet 138. Such an elongated 15 flexible mounting bracket 118 may be adhered to either the thermally dynamic sheet 138 or structure 136 in a manner similar to that discussed above for the embodiment of FIGS. 1–4.

Figure 6:
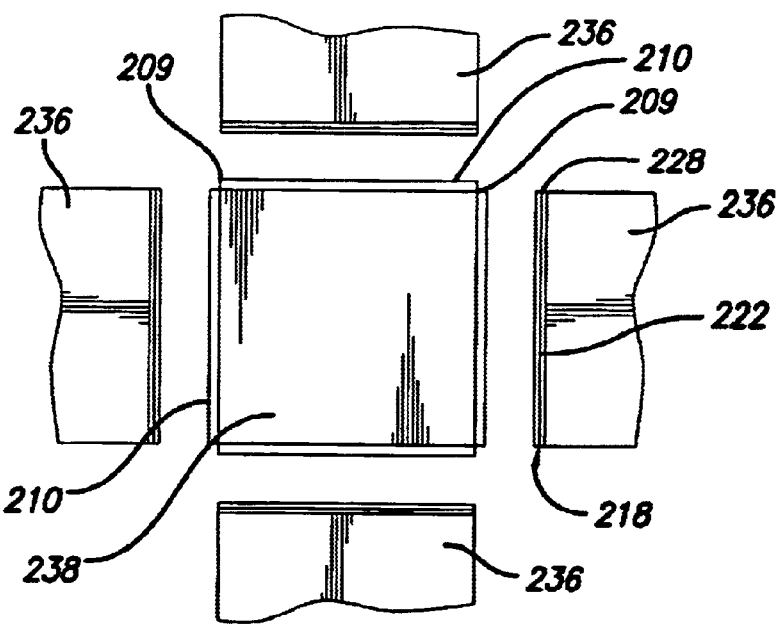
FIG. 6 is a schematic top view of another embodiment of the mounting system of the invention.

Turning now to the embodiment shown in FIG. 6, the present invention may also be used to provide an impermeable flexible mounting system for the screening, mounting or conjoining of a plurality of structures, at least one of which is relatively thermally inert, and another of which is thermally dynamic.

The embodiment a shown in FIG. 6 details the detachable or permanent conjunction of an elongated track 210 to each side of a thermally dynamic sheet 238.

As previously disclosed in the discussion of FIGS. 1–5, the elongated track 210 may consist of, a rigid material such as metal, hardened plastic or rubber and may be affixed to the thermally dynamic sheet 238 using any standard fasteners including, adhesives, screws, bolts, rivets, melt welds, and spot-welds. The thermally dynamic sheet 238 may consist of materials such as those described above with reference to the embodiments of FIGS. 1–5. It is also contemplated that the elongated track 10 may be affixed to each side of a thermally inert structure. While FIG. 6 demonstrates that individual pieces of elongated track 210 are attached to each side of the thermally dynamic sheet 238, it is also anticipated that the elongated track 210 may be continuously affixed to the thermally dynamic sheet 238 around corners 209.

The embodiment of FIG. 6 also discloses the adhesion of an elongated flexible mounting bracket 218 to at least one side of a plurality of structures 236, each having a side that will abut a portion of the elongated track 210 affixed on each side of thermally dynamic sheet 238. As previously disclosed in the discussion of FIGS. 1–5, the elongated flexible mounting bracket 218 is adhered to the structures 236 in a manner similar to that of FIGS. 1–4. Because the thermally dynamic sheet has the mounting track affixed to it, the track should be selected from materials having a similar co-efficient of thermal expansion to the track 210. Alternatively, depending upon the material used, the track may be integrally molded into the thermally dynamic sheet 228. The flexible mounting bracket 218 is preferably constructed of a rubber-like materials such as those discussed above with reference to the other embodiments. The elongated flexible mounting bracket 218, as earlier disclosed, additionally consists of a foot portion (not shown) that is shaped and dimensioned to be slidably retained within, and slidably mount to a hook portion of the track 210. The elongated flexible mounting bracket 218 also has, extending above the foot, a hinge portion 222 consisting of a first angled wall and second angled wall (not shown), which forms a hinge line 228 and flexes to accommodate the expansion and contraction of the thermally dynamic sheet 238. Additionally, extending from the second angled wall is a C-shaped clamping portion similar to that shown in FIG. 4, which encompasses the structure 236. The clamping portion has an internal extension which engages the interior of the structure 236 in a manner similar to that described above.

While the above disclosure of FIG. 6 one preferred embodiment, other similar embodiments are contemplated, specifically, including replacing the thermally dynamic sheet 238 with a relatively thermally inert structure and one or more of the structures 236 with a thermally dynamic structure(s). It is also contemplated that the thermally dynamic sheet 238, as seen in FIG. 6, may have a combination of elongated tracks 210 and elongated flexible mounting brackets 218 affixed to its sides. Also, while the embodiment demonstrates that individual pieces of elongated flexible mounting bracket 218 are attached to each side of the structures 236, it is also anticipated that the elongated flexible mounting brackets 218 may be continuously affixed to each structure 236. Moreover, structures 236 may have, the orientation of the brackets and tracks reversed whereby instead of elongated flexible mounting brackets, an elongated track is affixed to structures 236 and the flexible mounting bracket is affixed to the sheet 238. Finally, structures 236 may also be thermally dynamic and have affixed thereto elongated flexible mounting brackets 218.

The foregoing description and figures are intended as an illustration of the invention, and are not to be construed as containing or implying limitations upon the invention. It will be appreciated that, although various aspects of the invention have been described with respect to specific embodiments, alternatives and modifications will be apparent from the present disclosure which are within the spirit and scope of the present invention as set forth in the following claims.

The invention is claimed as follows:

1. A mounting system for mounting a thermally dynamic sheet to a structure comprising:
   an elongated track affixed to at least one of the thermally dynamic sheet and the structure;
   an elongated flexible mounting bracket affixed to at least one of the thermally dynamic sheet and the structure, the elongated flexible mounting bracket having (a) a foot portion adapted to slidably mount in the elongated track to provide sliding movement of the elongated flexible mounting bracket along an axis of at least one of the thermally dynamic sheet and the structure and (b) a clamping portion for encompassing an edge of at least one of the thermally dynamic sheet and the structure.

2. The mounting system of claim 1 wherein at least one of the elongated track and the elongated flexible mounting bracket is detachably affixed to at least one of the thermally dynamic sheet and the structure.

3. The mounting system of claim 1 wherein at least one of the elongated track and the elongated flexible mounting bracket is permanently affixed to at least one of the thermally dynamic sheet and the structure.

4. The mounting system of claim 1 wherein the cross section of the clamping portion of the elongated flexible mounting bracket is C-shaped.

5. The mounting system of claim 1 wherein the clamping portion of the elongated flexible mounting bracket is adhesively affixed to at least one of the thermally dynamic sheet and the structure.

6. The mounting system of claim 1 wherein the structure is a second thermally dynamic sheet.

7. The mounting system of claim 1 wherein the structure has a coefficient of thermal expansion substantially different than the thermally dynamic sheet.

8. The mounting system of claim 1 wherein the mounting system forms an impermeable seal.

9. A mounting system for mounting a thermally dynamic covering to a trailer comprising:
   a trailer side wall;
   a trailer end wall;
   a thermally dynamic covering;
   an elongated track affixed to a least one of the trailer side wall, the trailer end wall, and the thermally dynamic covering;
   an elongated flexible mounting bracket affixed to at least one of the trailer side wall, the trailer end wall, and the thermally dynamic covering, the elongated flexible mounting bracket having a foot portion adapted to slidably mount in the elongated track.

10. The mounting system of claim 9 wherein the elongated flexible mounting bracket includes a clamping portion for encompassing an edge of at least one of the thermally dynamic covering, the trailer side wall, and the trailer end wall.

11. The mounting system of claim 9 wherein the trailer includes the trailer end wall abutting the trailer side wall and wherein the elongated track is affixed to the trailer side wall and the trailer end wall.

12. The mounting system of claim 9 wherein the trailer includes the trailer end wall abutting the trailer side wall and wherein the elongated flexible mounting bracket is affixed to the trailer side wall and the trailer end wall.

13. The mounting system of claim 9 wherein the elongated track and the elongated flexible mounting bracket are attached to at least one of the trailer side wall, the trailer end wall, a second trailer side wall, the trailer end wall, a second trailer end wall, and the thermally dynamic covering.

14. The mounting system of claim 9 wherein the elongated track is continuous.

15. The mounting system of claim 9 wherein the elongated flexible mounting bracket is continuous.

16. A mounting system for mounting a thermally dynamic sheet to a plurality of structures comprising:
   a thermally dynamic sheet having a plurality of sides;
   a first structure adjacent to one of the plurality of sides;
   a second structure adjacent to another of the plurality of sides;
   an elongated track affixed to at least one of the plurality of sides of the thermally dynamic sheet, the first structure, and the second structure;
   an elongated flexible mounting bracket affixed to at least one of the plurality of sides of the thermally dynamic sheet, the first structure, and the second structure, the elongated flexible mounting bracket having (a) a foot portion adapted to slidably mount in the elongated track to provide sliding movement of the elongated flexible bracket along at least one axis of the plurality of sides of the thermally dynamic sheet and (b) a clamping portion for encompassing at least one of the adjacent sides of the thermally dynamic sheet, the first adjacent structure, and the second adjacent structure.

17. The mounting system of claim 16 wherein at least one of the elongated track and the elongated flexible mounting bracket is detachably affixed to at least one of the adjacent sides of the thermally dynamic sheet, the first structure, and the second structure.

18. The mounting system of claim 16 wherein at least one of the elongated track and the elongated flexible mounting bracket is permanently affixed to at least one of the adjacent sides of the thermally dynamic sheet, the first structure, and the second structure.

19. The mounting system of claim 16 wherein the cross section of the clamping portion of the elongated flexible mounting bracket is C-shaped.

20. The mounting system of claim 16 wherein the clamping portion of the elongated flexible mounting bracket is adhesively affixed to at least one of the sides of the thermally dynamic sheet, the first structure, and the second structure.

21. The mounting system of claim 16 wherein at least one of the first structure and the second structure is a thermally dynamic sheet.

22. The mounting system of claim 16 wherein the thermally dynamic sheet has a coefficient of thermal expansion substantially different than at least one of the first structure and the second structure.

23. The mounting system of claim 16 wherein the elongated track is continuous.

24. The mounting system of claim 16 wherein the elongated flexible mounting bracket is continuous.

25. The mounting system of claim 16 wherein the mounting system forms an impermeable seal.

26. A method of mounting a thermally dynamic sheet to a structure with a elongated flexible mounting bracket having a clamping portion and a foot portion comprising:

adhering the clamping portion of an elongated flexible mounting bracket to at least one of the thermally dynamic sheet and the structure to form an adhered assembly;

placing the adhered assembly in contact with the at least one of the thermally dynamic sheet and structure which lacks an adhered flexible mounting bracket;

positioning an elongated track along the at least one of the thermally dynamic sheet and structure which lacks the adhered flexible mounting bracket such that the foot portion of the flexible elongated mounting bracket is slidably retained within the elongated track; and mounting the elongated track to the at least one of the thermally dynamic sheet and structure which lacks the adhered flexible mounting bracket such that the foot portion is slidably mounted within the elongated track.

27. A mounting system for mounting a thermally dynamic sheet to a structure comprising:

an elongated track affixed to at least one of the thermally dynamic sheet and the structure;

an elongated flexible mounting bracket affixed to at least one of the thermally dynamic sheet and the structure, the elongated flexible mounting bracket having (a) a foot portion adapted to slidably mount in the elongated track to provide sliding movement of the elongated flexible mounting bracket along an axis of at least one of the thermally dynamic sheet and the structure; and (b) a hinge portion for flexing in a direction substantially transverse to the axis.

28. The mounting system of claim 27 wherein the hinge portion includes a first angled portion made of a resilient material, a second angled portion made of a resilient material and a hinge line joining the first angled portion and the second angled portion.

29. A mounting system for mounting a thermally dynamic sheet to a plurality of structures comprising:

a thermally dynamic sheet having a plurality of sides;

a first structure adjacent to one of the plurality of sides;

a second structure adjacent to another of the plurality of sides;

an elongated track affixed to at least one of the plurality of sides of the thermally dynamic sheet, the first structure, and the second structure;

an elongated flexible mounting bracket affixed to at least one of the plurality of sides of the thermally dynamic sheet, the first structure, and the second structure, the elongated flexible mounting bracket having (a) a foot portion adapted to slidably mount in the elongated track to provide sliding movement of the elongated flexible bracket along at least one axis of the plurality of sides of the thermally dynamic sheet, and (b) a hinge portion for flexing in a direction substantially transverse to the at least one of the opposing axis.

30. The mounting system of claim 29 wherein the hinge portion includes a first angled wall made of a resilient material and a second angled wall made of a resilient material, a hinge line joining the first angled portion and the second angled portion.

\* \* \* \* \*